UNITED STATES PATENT OFFICE.

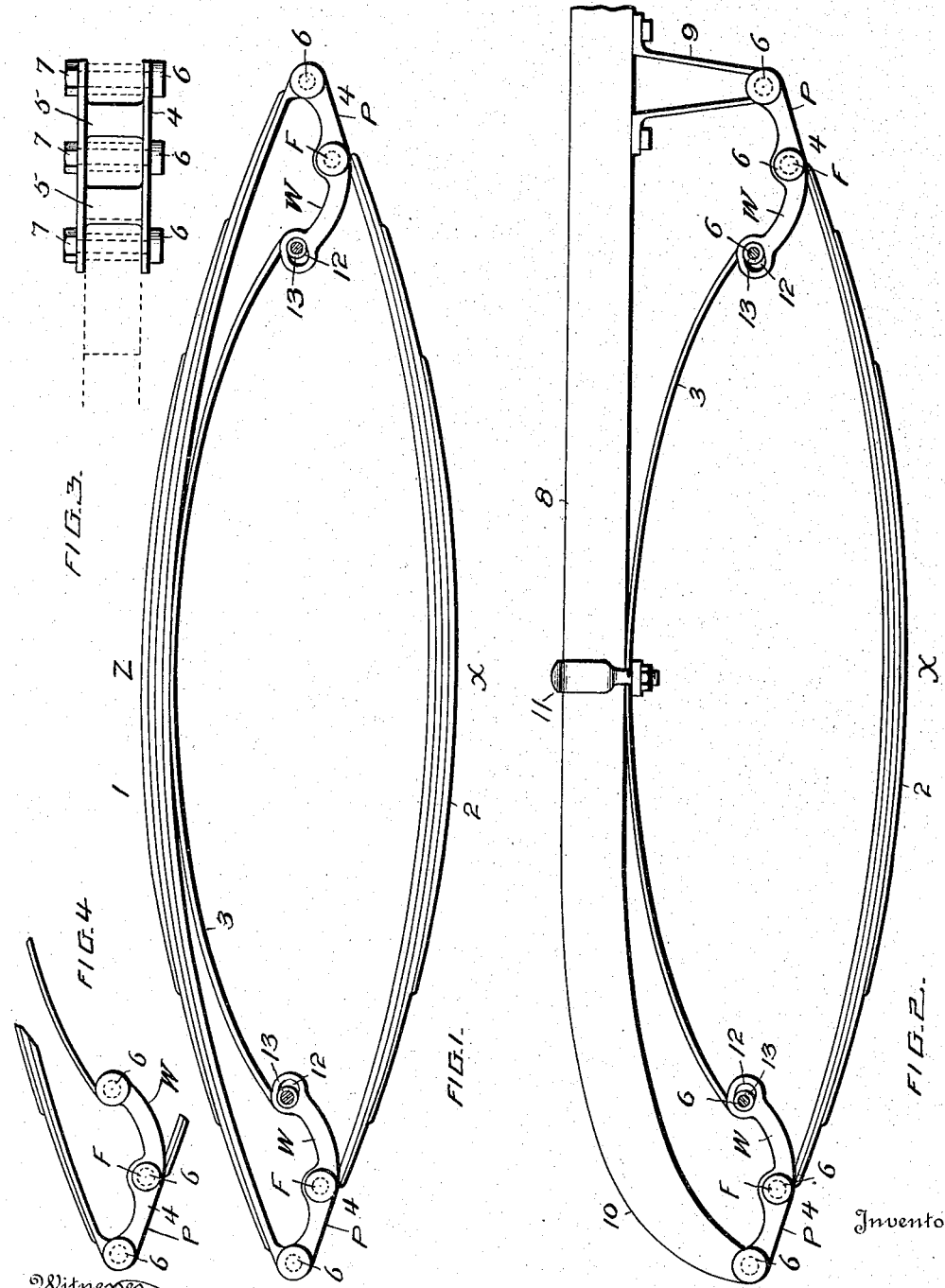

FRANK E. WILCOX, OF MECHANICSBURG, PENNSYLVANIA.

SPRING.

1,166,564.  Specification of Letters Patent.  Patented Jan. 4, 1916.

Application filed August 22, 1913. Serial No. 786,114.

*To all whom it may concern:*

Be it known that I, FRANK E. WILCOX, a citizen of the United States, residing at Mechanicsburg, in the county of Cumberland and State of Pennsylvania, have invented certain new and useful Improvements in Springs, of which the following is a specification.

The main object of the invention is the provision of spring means especially adapted for use in supporting the bodies of automobiles and other vehicles whereby the weight of the body initially will be supported by a spring, preferably a flexible leaf or leaves of low capacity, insuring an easy motion at relatively slow speed, and when the body moves upwardly and downwardly through a greater distance, which action accompanies relatively high speeds or the passage over rough roads or obstructions, the additional kinetic energy will be transmitted to a spring or springs of much higher capacity. However, parts of the entire spring means may be used to support a body directly under all conditions of service and when the above recited mode of operation is not the essential end to be attained.

The invention consists in certain novelties of construction and combinations of parts as herein set forth and claimed.

The accompanying drawing illustrates two complete examples of the embodiment of the invention and one modification constructed according to the best modes of procedure I have so far devised for attaining the main purpose, but, as before stated, parts only of the spring means shown may be used for the entire support of the body.

Figure 1 is a view in elevation of spring means comprising two main semi-elliptic springs of relatively high capacity and a supplemental spring of relatively low capacity. Fig. 2 is a view in elevation of spring means comprising a semi-elliptic spring and a supplemental leaf spring of less capacity than the semi-elliptic spring, connected with part of the frame of an automobile. Fig. 3 is a plan view of one of the levers to which the several springs are pivoted. Fig. 4 is a part view of spring means similar to one end of Fig. 1, but having a slightly modified construction of lever.

Referring to Fig. 1, the numerals 1 and 2 designate the two semi-elliptic springs of relatively high capacity, the spring 2 in this instance being shorter than the spring 1, as shown; 3, the supplemental spring of relatively low capacity located below the spring 1 and opposite the concave surface of spring 2 and consisting of a single leaf, though a plurality of leaves may be used; and 4, 4 are the levers to which the ends of the springs are pivoted. As shown by Fig. 3, each lever is in one piece, preferably forged to shape. It consists of two perforated side bars united by intermediate connecting cross pieces 5, 5. The springs 1 and 2 have eyes at the ends and are pivoted to the levers by bolts 6 with nuts 7 on the ends.

The combination in Fig. 2 differs from that of Fig. 1 in substituting for the spring 1 the side piece 8 of the under frame of an automobile. A bracket 9 is secured to the side piece 8, to which bracket one end of a lever is pivoted, the other lever being pivoted to the end 10 of the side piece, as shown.

The levers, lower main springs, supplemental spring and bolts of Figs. 2 and 4 are designated by the same numerals as used in Fig. 1. In both examples and Fig. 4 P is the power arm and W the weight arm of the lever, and F the fulcrum which is located at the ends of the spring 2 and as the spring can bend slightly the fulcrum is movable to a degree. The springs 2 are secured to an axle or other support at X and the power transmitted or applied to the center of springs 1 at Z: in Fig. 2 the power is applied to the arms P P of the levers by the side piece. The levers are of the first class, but should the spring means be reversed and the power be applied to the springs 2, 2 the levers would be of the third class. However, the mode of operation would be the same in both instances, as is obvious, and the spring means in practice may be used in either position. The supplemental spring in Fig. 2 is located below and secured intermediate its ends to the side piece 8 by a clip 11, or otherwise.

The modification, Fig. 4, has the ends of the three springs pivoted directly to the lever. In Figs. 1 and 2 a movable pivotal connection between the ends of spring 3 and arm W is provided by slotting the arm W at 12 and locating friction rollers 13 on the bolts 6 so as to allow the elongation of the spring as it is flexed under the action of the levers.

As before stated, parts of the spring means, for example, the lever and the supplemental spring 3, may be used in connection with substitutes for the spring 1 and side piece 8, in which case the spring 3 may be of increased capacity or composed of several leaves. Again, one-half of the spring means may be used, to the exclusion of the remainder.

The mode of operation is as follows: When the vehicle is moving at a relatively low speed the spring 3 carries the body yieldingly, but when it is moving at a high speed or is passing over a rough road, or when obstructions are encountered, the levers turn about their fulcrums until the spring 3 is flexed and brought into frictional contact with the spring 1 of the side piece 8, then the additional kinetic energy is transmitted to the springs 1 and 2 in the first example and to the spring 2 in the second example.

What I claim is:

1. The combination of a main semi-elliptic shaped spring, a lever having three pivotal points, a supplemental leaf spring facing the concave surface of the said main semi-elliptic spring; the said lever being pivoted intermediate its ends to the end of the main spring, its outer end extending outside of and beyond the main spring and its inner end overlapping the spring; and a support of greater length than the length of either of the two springs pivoted to said outer end of the lever, and the inner end of the lever pivoted to the end of the supplemental spring; means being provided in connection with the lever to permit the elongation of the supplemental spring when being flexed.

2. The combination of a main semi-elliptic shaped spring, two levers each having three pivotal points, a supplemental leaf spring facing the concave surface of the semi-elliptic spring; said levers being pivoted each intermediate its ends to opposite ends of the semi-elliptic spring, the outer end of each lever extending outwardly and exterior to the end of said semi-elliptic spring and the inner end overlapping the spring; and a support of greater length than the length of each of the two springs pivoted to the extreme outer ends of the levers, and the inner ends of the levers pivoted to opposite ends of the supplemental leaf spring; means being provided in connection with the levers to permit the elongation of the supplemental spring when being flexed.

3. The combination of a main semi-elliptic shaped spring, a lever having three pivotal points, a supplemental leaf spring of less capacity than said semi-elliptic spring facing the concave surface of the said main semi-elliptic spring; the said lever being pivoted intermediate its ends to the end of the main spring, its outer end extending outside of and beyond the main spring and its inner end overlapping the spring; and a support of greater length than the length of either of the two springs pivoted to said outer end of the lever, and the inner end of the lever pivoted to the end of the supplemental spring; means being provided in connection with the lever to permit the elongation of the supplemental spring when being flexed.

4. The combination of a main semi-elliptic shaped spring, two levers each having three pivotal points, a supplemental leaf spring of less capacity than said semi-elliptic spring facing the concave surface of the semi-elliptic spring; said levers being pivoted each intermediate its ends to opposite ends of the semi-elliptic spring, the outer end of each lever extending outwardly and exterior to the end of said semi-elliptic spring and the inner end overlapping the spring; and a support of greater length than the length of each of the two springs pivoted to the extreme outer ends of the levers, and the inner ends of the levers pivoted to opposite ends of the supplemental leaf spring; means being provided in connection with the levers to permit the elongation of the supplemental spring when being flexed.

In testimony whereof I affix my signature in presence of two witnesses.

FRANK E. WILCOX.

Witnesses:
B. V. ZIEGLER,
J. E. HOERNER.

Copies of this patent may be obtained for five cents each, by addressing the "Commissioner of Patents, Washington, D. C."